(12) United States Patent
Sharma et al.

(10) Patent No.: US 12,027,073 B2
(45) Date of Patent: Jul. 2, 2024

(54) POLYMORPHIC ENCRYPTION FOR SECURITY OF A DATA VAULT

(71) Applicant: SKYFLOW, INC., Palo Alto, CA (US)

(72) Inventors: Anshu Sharma, Los Altos, CA (US); Prakash Khot, Andover, MA (US); Pradeep Reddy, Palo Alto, CA (US); Roshmik Saha, Palo Alto, CA (US)

(73) Assignee: SKYFLOW, INC., Palo Alto, CA (US)

( * ) Notice: Subject to any disclaimer, the term of this patent is extended or adjusted under 35 U.S.C. 154(b) by 76 days.

(21) Appl. No.: 17/364,777

(22) Filed: Jun. 30, 2021

(65) Prior Publication Data

US 2023/0005391 A1    Jan. 5, 2023

(51) Int. Cl.
| | |
|---|---|
| *H04L 29/06* | (2006.01) |
| *G06F 21/60* | (2013.01) |
| *G06F 21/62* | (2013.01) |
| *G09C 1/00* | (2006.01) |
| *G06F 21/31* | (2013.01) |

(52) U.S. Cl.
CPC ............ *G09C 1/00* (2013.01); *G06F 21/604* (2013.01); *G06F 21/62* (2013.01); *G06F 21/31* (2013.01)

(58) Field of Classification Search
CPC ......... G06F 21/62; G06F 21/31; G06F 21/604
See application file for complete search history.

(56) References Cited

U.S. PATENT DOCUMENTS

| | | | | |
|---|---|---|---|---|
| 10,997,301 | B1* | 5/2021 | Rivlin | .................. G06F 21/602 |
| 2015/0019858 | A1* | 1/2015 | Roth | ..................... H04L 63/107 |
| | | | | 726/1 |
| 2015/0310228 | A1* | 10/2015 | Benz | ....................... H04L 63/04 |
| | | | | 726/26 |
| 2017/0185790 | A1* | 6/2017 | Gauda | ................. G06F 21/1079 |

OTHER PUBLICATIONS

Acar, Abbas, et al., A Survey on Homomorphic Encryption Schemes: Theory and Implementation, Florida International University Mauro Conti, University of Padua, 35 pages, ACM Computing Surveys, vol. 51, No. 4, Article 79. Publication date: Jul. 2018.
Agrawal Rakesh, et al., Order Preserving Encryption for Numeric Data, IBM Almaden Research Center, 12 pages, SIGMOD Jun. 2004 1318, 2004, Paris, France.
Boldyreva, Alexandra, et al., Order-Preserving Encryption Revisited: Improved Security Analysis and Alternative Solutions, College of Computing, Georgia Institute of Technology, 36 pages, CRYPTO 2011, 31st Annual International Cryptology Conference, P. Rogaway ed., LNCS, Springer, 2011.

* cited by examiner

*Primary Examiner* — Jason K Gee
(74) *Attorney, Agent, or Firm* — Loza & Loza, LLP; Gordon R. Lindeen, III

(57) ABSTRACT

Polymorphic encryption is described in a way to restrict access and enhance security of a data vault. In an example, the data vault has a primary partition with a first subset of records having an encrypted value for each of at least a portion of the fields encrypted according to a first encryption scheme. A secondary partition has a second subset of the records encrypted according to a second encryption scheme (Continued)

that is different from the first encryption scheme. The first encryption scheme is configured to permit a first set of operations on the values when the values are encrypted and the second encryption scheme is configured to permit a second set of operations on the values when the values are encrypted.

20 Claims, 10 Drawing Sheets

POLYMORPHIC ENCRYPTION FOR SECURITY OF A DATA VAULT

FIELD

Embodiments of the invention relate to the field of data security; and more specifically, to polymorphic encryption applied to multiple data partitions of a secure data vault.

BACKGROUND

In recent decades, businesses have significantly increased the amount of sensitive data they collect in order to create personalized customer experiences and unlock new growth opportunities. At the same time, secure data storage has become more difficult as private and state actors relentlessly strive to obtain unauthorized access to private data. Recently the personal, medical, and financial records of many private data repositories have been exposed to the public. Other records have been stolen and sold to third parties. In response to the frequent exposure of private information, some governments have implemented new laws requiring that certain kinds of data, such as personal and health information be kept secure. At the same time business success may require that trade secrets and business relationships also be kept secure.

One approach to thwart the great variety, pervasiveness, and number of the attacks is to encrypt the data in a specialized private data repository. Encrypting the data renders the data useless unless it can be decrypted, but it also makes the data difficult to use. There are two primary approaches to using encrypted data. A first approach is for the user of the data store to decrypt the data, operate on the data, re-encrypt the data, and then store the data again. This requires that the data be sent and received between the data store and the user and it requires that the user have decryption rights, creating attack vectors. If multiple parties are able to access, decrypt, and re-encrypt the data, then an attacker has multiple vectors of attack with each party.

A second approach is to perform the operations in the data store while the data is encrypted. Such operations are very difficult or impossible to perform so that it becomes more expensive to use the data. One variety of this approach is referred to as fully homomorphic encryption which attempts to allow operations to be performed on data while the data is encrypted. Currently, the available types of fully homomorphic encryption are limited and complex. The operations require significant processing resources to accomplish. These expenses have significantly limited the development of any functioning fully homomorphic database.

BRIEF DESCRIPTION OF THE DRAWING FIGURES

The invention may best be understood by referring to the following description and accompanying drawings that are used to illustrate embodiments of the invention. In the drawings.

DETAILED DESCRIPTION

Figure 1:
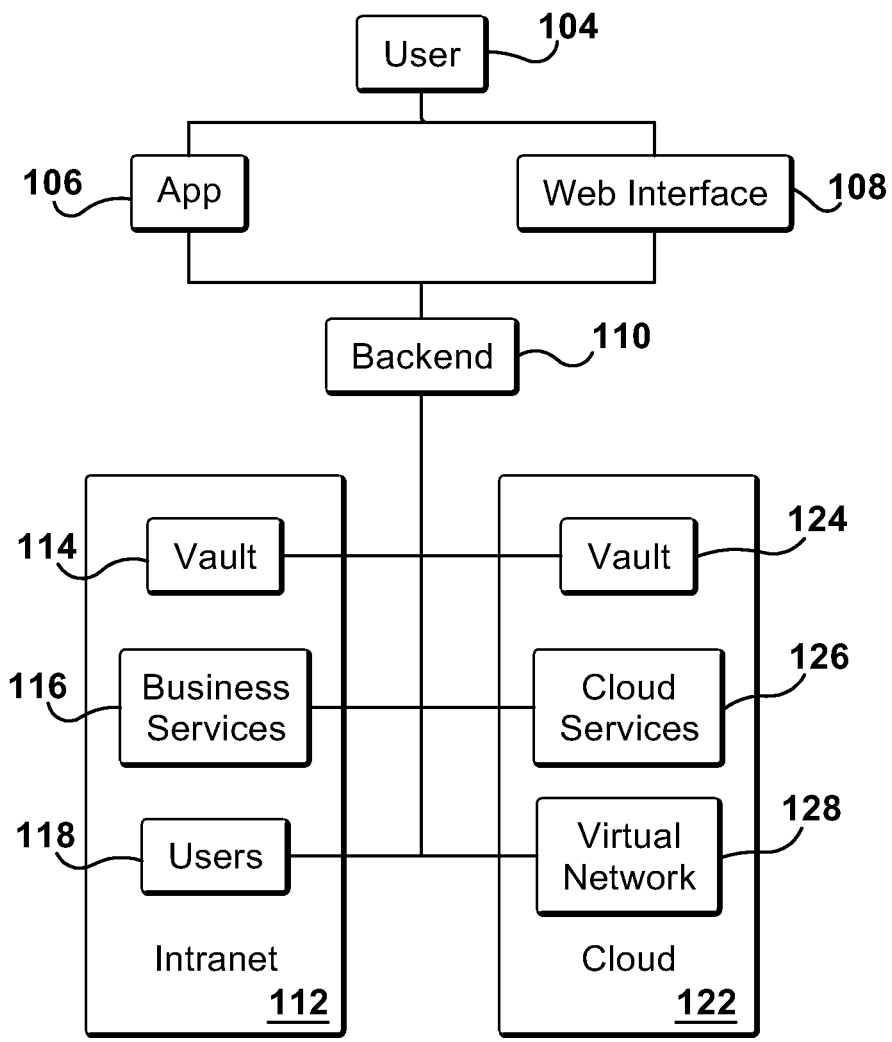
FIG. 1 is a block diagram of a high-speed infrastructure with high availability and security in combination according to embodiments of the invention.

Data security systems seek to find some compromise between access and security. Access is commonly understood as a large number of users having very fast and convenient access to everything that they might want or need. This access is preferably platform-agnostic and reliable so that redundant copies of the data are stored on different hardware platforms and locations that are accessible from any user location including mobile devices. This typically entails providing the data over a range of different networks, both wired and wireless, that are controlled by different operators. Security is commonly understood as password protection and encryption. Passwords can be replaced with biometric information, such as fingerprint, face, or retina scanners, but in most cases these are provided for user convenience and the system can be accessed with a password alone. Some systems have adopted two-factor authentication and a few systems operate with point-to-point encryption. Many systems have different levels of permission to restrict data access to particular classes of users. The permission levels are protected again with passwords. While the objective of immediate and universal data access has largely been achieved with many networks and systems, data security has frequently been compromised.

A common approach towards protecting sensitive data has been to use a number of encryption and tokenization solutions to de-identify the data, ensuring that the data cannot be exploited when it is exposed. The challenge with this approach is that once the data is encrypted, it is no longer useful to the applications and tools that need it to drive the business.

As described herein, a secure data vault is implemented that provides access with security by isolating sensitive data and by providing multiple different encryption forms that are tailored specifically to different users' needs. The sensitive data can be quickly operated on without decrypting the data and often without sending or receiving any sensitive data. When the stored data stays encrypted, and is only transmitted in encrypted form, if at all, then it can be stored redundantly in local and cloud copies with less risk.

While it may be common to store sensitive data in full form, well-annotated and well-referenced, in many instances, this is not necessary. In many scenarios, a user only requires access to a portion of the information. In many scenarios, the user does not require any of the information but only a result determined using the information, such as an average, a maximum, a number of entries or confirmation of some or all of a value. Instead of granting limited access to a large data set, a new data set may be created that has only the necessary information for a particular scenario. A secure data store may be built by identifying a class of users, determining the data that the class of users requires, determining the operations that the class of users requires to perform on that data, and determining an encryption scheme that supports the required operations. The same data may be prepared for more than one class of users. The data may be encrypted in a different way, and stored as a separate copy for each class of users or even for different operations required by the same class of users. With the operations and encryptions determined, that data may then be stored in encrypted form. Security is enhanced if the encrypted data and access control to the encrypted data is isolated from other stored data.

In embodiments described herein, each category of sensitive data is interpreted as a unique data structure composed of different components which can have different use cases. The use cases are identified and different encryption, tokenization and redaction algorithms are used to run operations for each use case on fully encrypted data. In this way, a telephone number is not encrypted in the same way that an email address, social security number, or driver's license number is encrypted. A telephone number may be identified as a complex data type composed of three or more unique structures, such as country code, an area code, and a local code. Each of these components has a different use case. A business may use the country code to understand how many international users it has or which call center to route an incoming call to. The area code may be used to understand customer distribution by area code or used to segment other attributes such as income by area code. Lastly, the local code may be shown in a masked form to verify the correct phone number for multi-factor authentication. These are just a few examples of uses for a telephone number there may be many others and all or parts of other fields may similarly by used in many different ways. The telephone number provides an example of data that may be separated into different parts or different parts may be masked or redacted. The parts may each be stored differently for different uses. In addition, the same part may be stored in different ways for different uses. This may apply also to other data fields.

Telephone numbers may be used to suggest information about the customers in the database. An e-mail address suggests very different information. The top level domain might suggest a location such as .se for Sweden or it may suggest other information such as .tech or .org. The second level domain indicates the e-mail provider which may or may not suggest an employer and the e-mail name may or may not suggest a name or an identity. A social security number suggests almost nothing about a person except that numerically higher numbers were issued later. Because the information in each type of sensitive data is different, a user requires different operations for different types of data.

Consider, for example, the telephone number with three fields, the country code, area code, and the local code. These fields may be encrypted differently in different copies each to support a different use case. At least some of the copies may not include the entire telephone number. The unnecessary parts may be masked or redacted. The different encryptions may be selected to enable operations to run on the data without decrypting the data. For example, a user may wish to perform exact matches in order to find records in the secure data vault that have the same area code and then to match persons in the same area code with an income field to determine an average income within the area code. The area code may be encrypted without the country code and local code and stored independent of the other fields. The encryption type may be based on supporting the matching function for the area code on fully encrypted data. The income field corresponding to the selected area code may be encrypted in a format that allows an average of the incomes to be taken without exposing any one income in that or any other area code. This configuration allows an average income to be determined by area code without ever decrypting the area code or the income data.

The telephone number may also be separately encrypted by using a redaction algorithm on the local code to mask the country code and the area code and only show the last four numbers for identity verification. In this way, different portions of the telephone number have been encrypted differently using two different encryption algorithms to facilitate different operations on the fully encrypted data for different use cases. When the different use cases are known from the start then the different versions of the data can be created at the time that the data is ingested. When new use cases are added later, then another different version may be created as a background process. This may be described as encrypted projections to optimize for query performance and may be considered to be analogous to a traditional database system using indexes as projections to optimize query performance.

The data in its different versions may be made accessible through APIs (Application Programming Interface) so that different versions of the same data may be retrieved based on the parameters of a particular API. For example, a customer service application that has access only to social security numbers in a redacted form can use an API with one set of parameters. Another application that has access to social security numbers in a plain-text or masked form, can use an API with a different set of parameters.

FIG. 1 is a block diagram of a high-speed infrastructure with high availability and security in combination. In this infrastructure 102 a user 104 has access to resources through an app 106, through a web interface 108 or through any other suitable interface. The user may be a member, vendor, customer, or employee of an enterprise. Other users obtain access to enterprise resources in the same or a similar way. All of the interfaces connect through a backend 110. Privacy-first APIs may be configured to be highly available and backed by a highly secure backend hosted on a cloud service or a local network. The user 104 may be isolated by the backend for different services across customer instances to ensure unparalleled security and privacy. On one side, the backend is coupled to and may be hosted by an intranet 112 to support internal business processes of the enterprise. On another side, the backend is coupled to and may be hosted by cloud services 122 for wide availability.

The intranet 112 includes a discrete secure vault 114 that is isolated from other resources. The intranet also includes any business services 116 used to support the work of the enterprise and connections to other users 118 that may also be working with the business services 116. The cloud hosting 122 may be used to host a vault 124, cloud services 126 used by the enterprise, and a virtual network 128 that provides connections to other resources and users of the enterprise. The vault 114 on the local side 112 and the vault 124 on the cloud-hosted side 122 may be hosted in different regions and availability zones to ensure availability and to transparently handle and recover from failures without service disruption. Synchronous data replication may be employed to minimize data loss in the event of local failures. In embodiments, users 104 are allowed access to all of the services 118, 118, 126, 128 through apps 106 and other interfaces 108 but are only allowed access to the vault 114, 124 when needed and only through dynamic, fine-grained policies.

Figure 2:
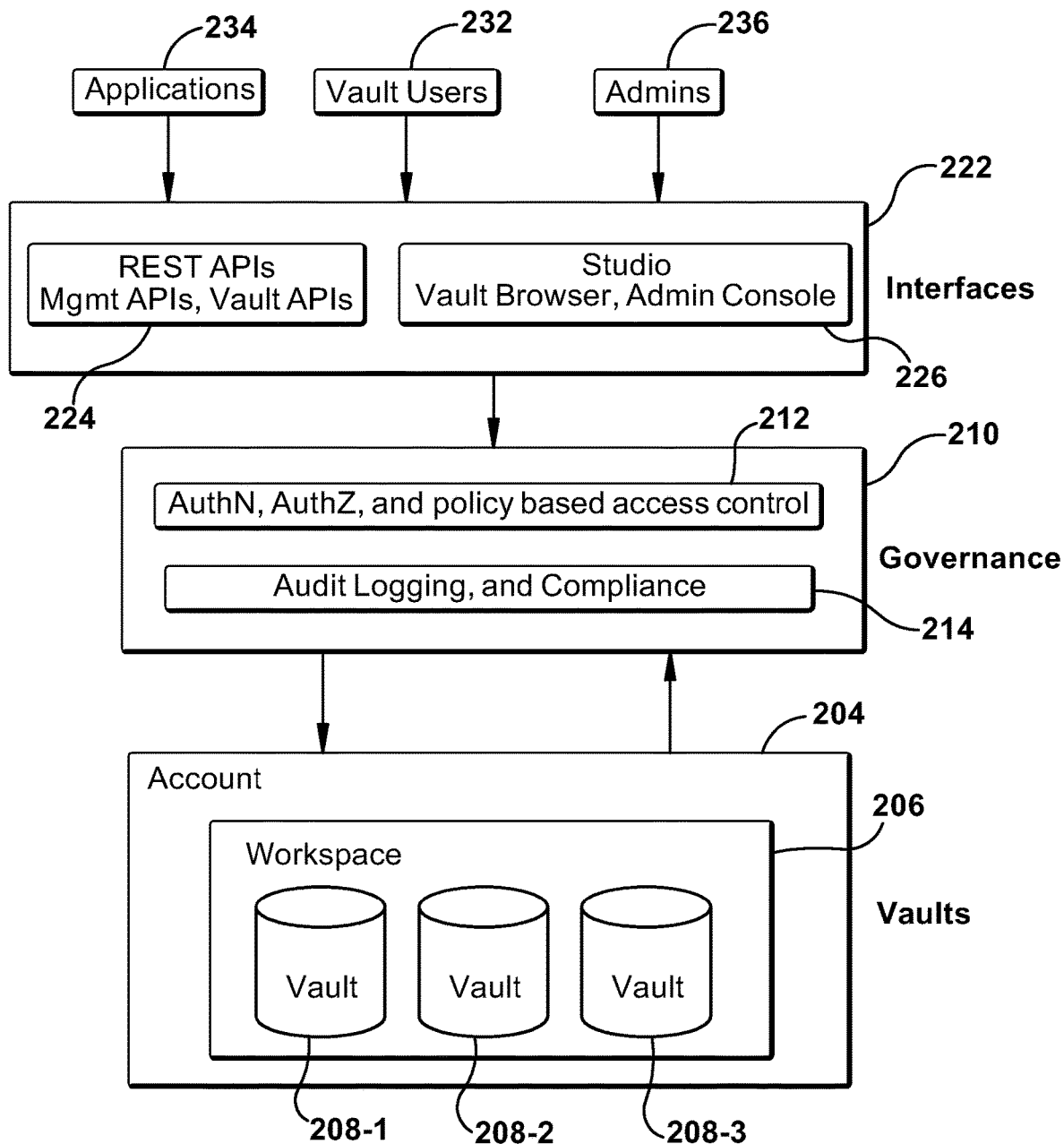
FIG. 2 is a block diagram of a system with multiple account access to data vaults according to embodiments of the invention.

FIG. 2 is a block diagram of a system with multiple account access to data vaults. An account 204 includes a workspace 206 that includes one or more data vaults 208-1, 208-2, 208-3. The data vaults are secure and use sophisticated privacy technology to keep data secure and private. The vaults 208 may be isolated, highly distributed, and highly available to store sensitive data. The data may be encrypted at rest, in transit, and in-memory while being processed. This constant encryption dramatically improves business security posture, as a significant number of data breaches happen on in-memory data. On top of strong encryption, the vaults 208 may incorporate several privacy-preserving technologies to protect sensitive data.

The data in a vault may be configured in any of a variety of different ways. In embodiments, a high-level schema is provided as a working template based on typical business needs. The template may include fields and relations in a database format. For example, a customer identity vault template may include the sensitive fields a business would typically want to collect about a customer (e.g., name, email, address, telephone number, billing account, organization, date of birth, etc.). An administrator may add or delete fields and populate the template with actual data.

In some embodiments, enterprise-grade governance tools 210 control access to the account and the vaults. The governance tools may include any of a variety of different policy-based access controls 212 and audit, logging, and compliance controls 214 to grant or deny access to data in the vaults 208. Data sets in a data vault may have corresponding audit logs that record all events. The logs may be aggregated and reported in analysis, audit, and metrics dashboards. The governance tools may also provide a Role-Based Access Control (RBAC) model in addition to a Policy-Based Access Control model. RBAC provides easy access control to stakeholders based on roles and privileges.

Users 232, applications 234, and administrators 236 obtain access to the governance tools through a direct interface 222, such as a browser interface and administrative console, or through APIs (Application Programming Interfaces) 224, such as REST (Representational State Transfer) APIs, management APIs, and vault APIs. The browser interface may be used to enable data exploration and account management with a simple graphical user interface. Clicking on various links, panes, windows, and dialog boxes may be configured to drive queries and other operations. The APIs allow applications and user interfaces to obtain access to the data vaults for a variety of user functions. The APIs may also be used for account and workspace management functions.

Figure 3:
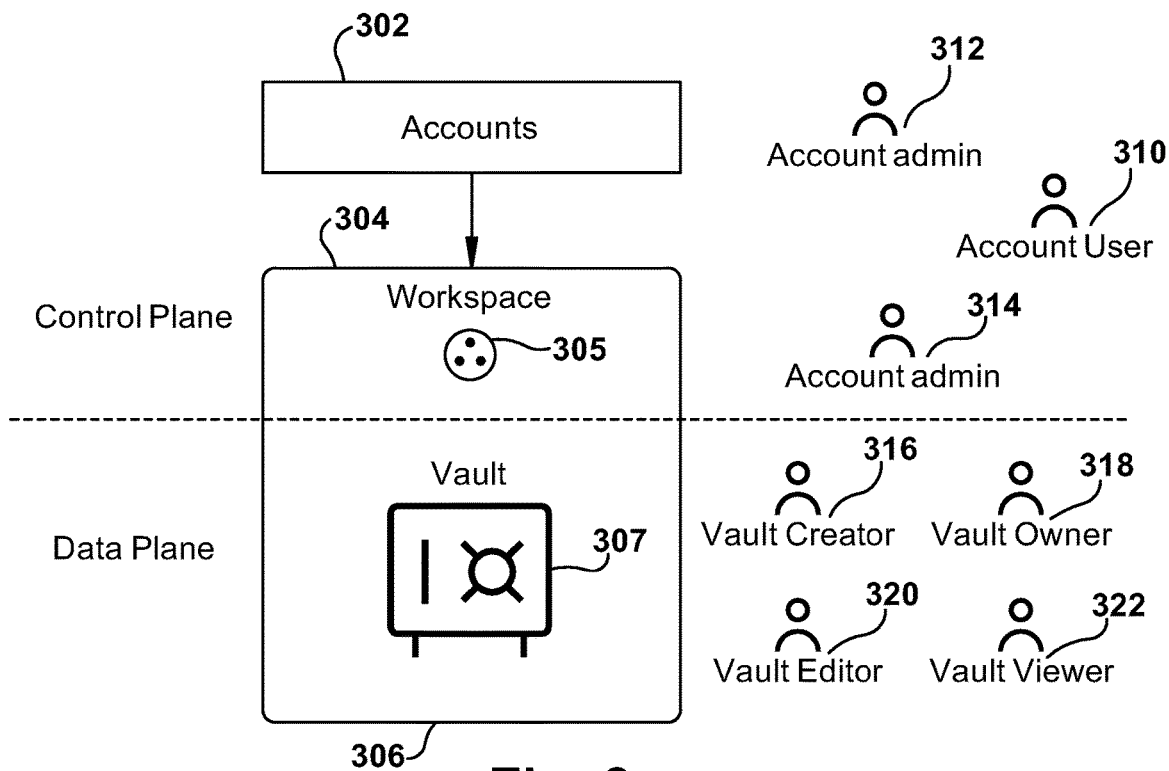
FIG. 3 is a block diagram of a secure vault in a data plane with control plane access according to embodiments of the invention.

FIG. 3 is a block diagram of a secure vault in a data plane with control plane access to indicate some of the roles that may be supported. The accounts 302 as shown in FIG. 2 gain access to the vault 307 through a workspace 305. The accounts and the workspace may be considered to be in a control plane 304 and the vault may be considered to be in a data plane 306. Within the control plane are a class of workspace users 310 that have roles that require access to the workspace and limited access to the encrypted data in the vault based on roles and allowed policies. For the roles of these workspace users 310, the vault data is encrypted.

The roles may include administrative roles. A role for an account administrator 312 may include ability to add new accounts for new interfaces and add new roles for those interfaces. A role for a workspace administrator 314 may include controlling access to the workspace including one or more data vaults and managing the workspace and the data stored in the data vaults. A workspace administrator role may include policies for viewing and editing the secure data in plain text or any other suitable native or human-readable format.

Vault roles have access to the data in the data plane 306 that resides in the data vault 307. A vault creator 316 may have an ability to create the schema for the data in the vault and to populate the data in the vault. A vault owner 318 may serve as a custodian of the data in the vault and may control access to the data in the vault. This may include creating roles or policies that allow for access to the vault data. A vault viewer 320 may have access to view and edit the data in the vault but may be prohibited from viewing the data in plain text as the vault owner can. A vault viewer 322 may have access to view the data in the vault with certain limitations but not to edit or modify or delete any data. The various roles shown in FIG. 3 are provided as examples and the capabilities, names, and other characteristics of any one or more of these roles may be modified to suit any particular circumstance.

Figure 4:
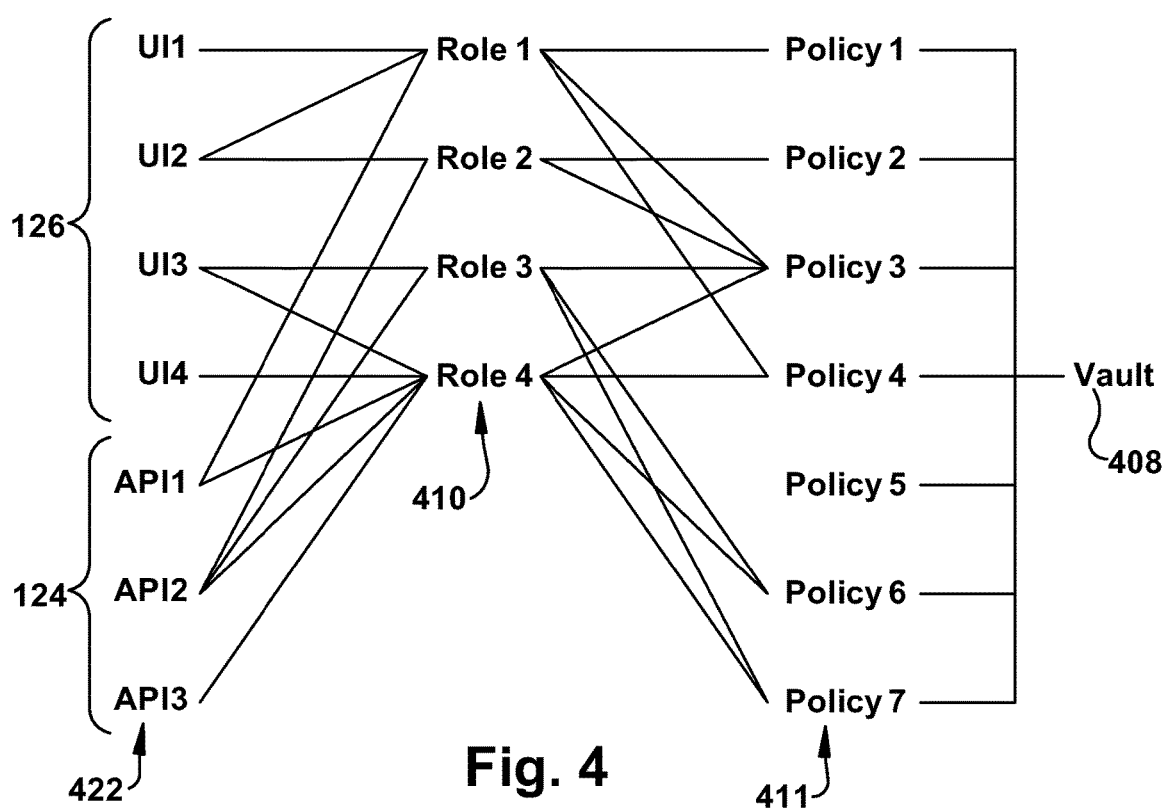
FIG. 4 is a diagram of a configuration of access to a data vault according to embodiments of the invention.

FIG. 4 is a diagram of a configuration of access to a data vault 408. Interfaces 422 which may include user interfaces 126 and APIs 124 are each coupled to a governance layer through associations with one or more roles 410. The roles are each associated with one or more policies 411 and with one or more interfaces. The policies allow access to the data vault 408. The governance layer provides a set of capabilities that enable customers to govern and control access to sensitive data that reside in the data vault. The governance layer enforces granular, real-time decisions on every data access request with minimum latency. The user interfaces 126, using a browser or console, allow a policy expression language and an accompanying policy code editor to be used to author complex and condition-based access rules as policies 411. Each role corresponds to a grouping of policies that allow a user or group of users to act in that role, such as account representative, physician, billing, scheduling, customer support etc. Stated another way, policies are reusable sets of access rules that can be attached to one or more roles. The policies allow a dynamic, granular, real-time, condition-based set of rules to govern access to the vault. The policies associated with the role allow the user in that role to perform only those operations that are needed for the role.

The plurality of roles allows an approach of isolate, protect, and harness to manage sensitive data access. Applications are allowed to communicate with each other and to share data through the APIs 124. This harnesses the value of the sensitive data. However, each API is associated with only selected roles. The policies may be configured to employ data loss prevention techniques such as tokenization, redaction, masking, and encrypted computing so that the same data is shared differently depending on the assigned role. In an example, a vault owner creates a policy, then authors a set of granular rules for it. The vault owner can then attach this policy to one or more roles. This action grants a set of permissions to the role. The role can then be assigned to users (UI) or Service Accounts (API).

In one example, a credit card applicant sees her own PII (Personally Identifiable Information) including her SSN (Social Security Number) in plain text. However, a customer support agent sees only the last 4 digits of her SSN for identity verification purposes. The rest is masked. In another example, a front-office staffer leverages the power of encrypted computation to match the SSN of a customer without ever viewing the entire SSN column in plain text. Only a confirmation of the match is displayed. In the United States, the SSN is a unique nine-digit number assigned to a person for taxpayer identification purposes. It is also used for banking, medical, and insurance transactions. In another example, a physician can view and edit medication information of only those patients she treats and not the entire patient database. In another example, medical test and treatment results for a patient are shared with government officials only if the patient has given consent to share their data.

The policies and the structure of the data vault may be used to minimize data access with granular access control. The attack surface area of sensitive data is reduced. The roles may be used to ensure that user interfaces and apps have access only to the specific fields needed to perform the permitted operations that support a legitimate business function. In the example of a data table model, very granular and condition-based access policies may be provided by using column-level and row-level access control, support for SQL WHERE clauses, and Common Expression Language.

Figure 5:
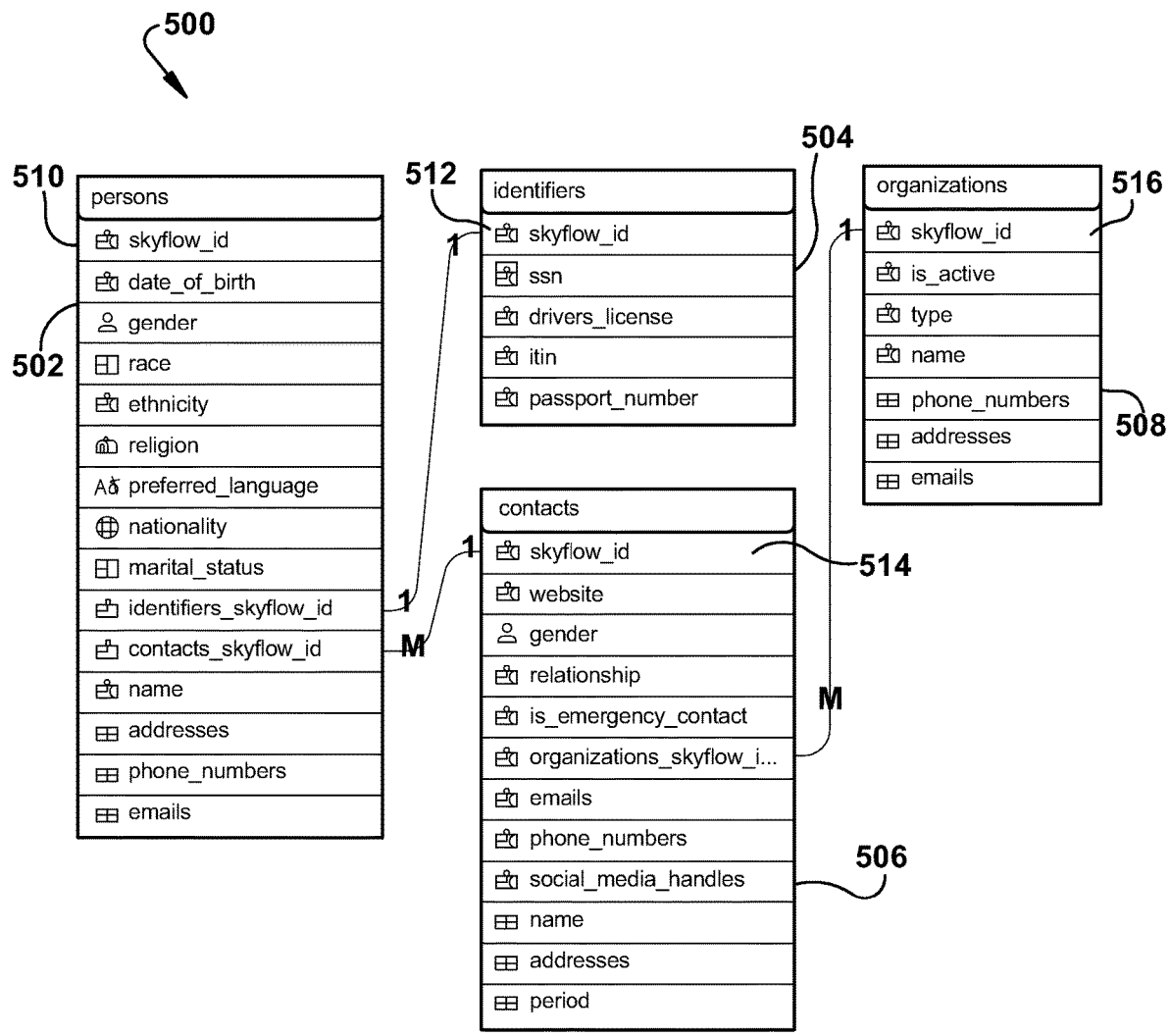
FIG. 5 is a diagram of a GUI (Graphical User Interface) for an example schema for a customer identity data vault according to embodiments of the invention.

FIG. 5 is a diagram of a GUI (Graphical User Interface) for an example schema for a customer identity data vault. Such a GUI may be presented to a workplace administrator, vault creator, vault editor, or vault owner. The schema 500 is represented as a relational database with linked tables, but any other storage format may be used. The customer identity vault is an example of a structure for storing sensitive personal information. More or less information may be stored, depending on the needs of the users. The same or a similar structure may be used for other types of information. In this example, customer identity encompasses all the personal information related to an individual customer or user needed by the vault's users. Identity could include everything from demographic data such as gender and race, to contact information such as email and phone number, to key personal identifiers like SSN. The present schema 500 has four tables inside the customer identity vault, a persons table 502, an identifiers table 504, a contacts table 506, and an organizations table 508. The tables are illustrated with a single column showing a label for each row. The next column to the right which is not shown contains values for a particular customer. Each column is directed to a different customer. Each table will have hundreds, thousands or more columns, there being one for each customer. The particular configuration of rows and columns may be modified to suit any different data sets and use scenarios.

The tables are all connected or related by an index field 510, 512, 514, 516 which is called skyflow_id in this example. The index field uniquely identifies a particular customer. Each field in the vault (e.g., skyflow_id, SSN, gender, etc.) may also have an associated privacy data type, as described in more detail below. A vault owner or workspace manager can insert data into the vault from an interface or API by entering the parameters that are to be changed. An interface may allow for a user to identify a table or object, a row, and a column, and then the new or different value that is to be written there. In some embodiments, the new values are indicated in a JSON (JavaScript Object Notation) format.

Figure 6:
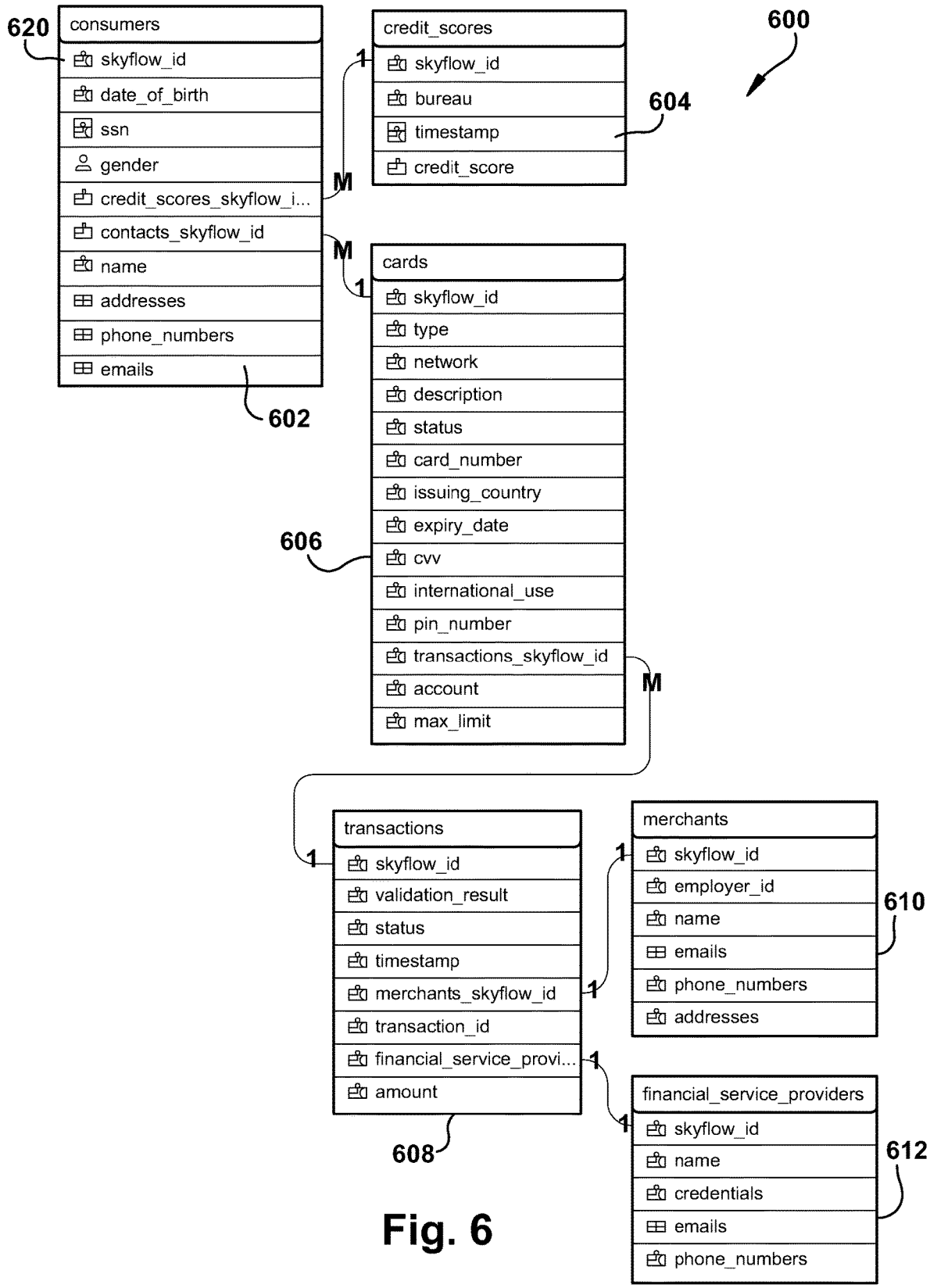
FIG. 6 is a diagram of a GUI (Graphical User Interface) for an example schema for a payments data vault according to embodiments of the invention.

FIG. 6 is a diagram of a GUI for an example schema for a payments data vault. The payments schema 600 is also represented as a relational database with linked tables but any other storage format may be used. The payment vault structure 600 has six tables or objects, however, there may be more or fewer to suit different applications. In this example, there is a consumers table 602 for a profile of each consumer, including information such as name, address, email etc. A credit scores table 604 includes consumer credit data such as credit scores and credit reports. A cards table 606 contains card information including PAN (Primary Account Number), expiration date, issuing country etc. A transactions table 608 contains payment transaction-related data including merchant, amount, transaction validation result, etc. A merchants table 610 contains merchant profiles. The type of merchant may be modified to suit a particular business. The merchants may be vendors, customers, partners, or other merchants. A financial service provider table 612 has information about the financial service providers that are used by the company that owns the vault.

This example payments data vault 600 also uses an index field called skyflow_id 620 to relate all of the tables together. As with the customer identity vault, the illustrated tables represent the headers of two-dimensional tables that include a column for each object and a row for each attribute. Each field has a value for each object or for each unique skyflow_id. The values in the vault can only be modified by those with special access privileges. Indeed, any interaction with data in a vault may be restricted by particular privileges pertaining to the particular role with which a user or application attempts to access the data.

The payment vault may be designed to help companies reduce their PCI (Payment Card Industry) compliance scope and bring products to market faster. The vault may be used as a sensitive object store for sensitive financial data such as credit data, card issuance data and payment data. By storing sensitive financial data in the payment vault, a company can reduce the cost of maintaining security because that data will not be stored on company servers. As a result, the company can focus on product innovation and bringing products to market faster.

As with the customer identity vault or any other vault, the payment vault also enables businesses to execute secure vault functions within the security confines of the vault. These vault functions may be configured to enable businesses to make external API calls from directly within the vault. This reduces the need for any sensitive data regarding the API call to leave the vault and risk interception or capture. For example, an API call may be made directly from the vault to financial service providers. These calls may be used to support credit checks, card issuance and payment processing vault functions.

Some example uses of a payment vault include reducing the scope of a company's PCI Compliance by offloading sensitive data from the company's systems to the external vault using tokenization or other common design patterns. Another use is for credit score checks. A business can create a user profile and retrieve a consumer credit score from one or all of the three main credit bureaus: Experian; Equifax; and Transunion, among others. Another example is to use the vault for credit card issuance. A business may create a new card program with a partner and issue cards to its customers. Such a payment vault may also be used for payment processing in which the vault aids the company in obtaining the values needed to process a payment through partners. Any other vault may be configured by specifying all the tables and fields that are desired as well as their properties. Tables are added to the schema. Fields are added to each table and tags are attached to each field.

Privacy is preserved in the secure data vault with multiple techniques which include sophisticated inference and encryption algorithms including de-identification, tokenization, anonymization, and a technique that will be referred to as polymorphic encryption. De-identification is used in conjunction with tokenization technology to help businesses reduce the amount of sensitive data that is stored on their servers and to replace at least some of that data with tokens. Different kinds of tokens may be used to suit different operations and use cases. These include Data-Loss-Prevention (DLP) tokens, format-preserving tokens, which contain the format and none of the data, and random tokens, which contain none of the data.

Anonymization may be used to abstract away the identifying details in data, to prevent the data from being traced back to an individual. Anonymization enables use-cases like secure multi-party data sharing, that allows businesses to share data with their partners without compromising the integrity and privacy of the data, and data analytics on privacy sensitive data.

Polymorphic encryption as described herein securely protects all sensitive data at rest, in transit and during processing. Traditional databases secure data at rest, but during a query, in-memory decryption followed by processing makes it insecure. Processing data post-decryption is a huge vulnerability for businesses because 46% of data breaches happen on in-memory data. The described type of polymorphic encryption allows data to be queried and processed while remaining encrypted, providing unprecedented security and privacy.

Fields in each table, shown as rows in the drawing figures, may each be assigned a privacy data type (PDT) as a classification of various kinds of sensitive data based on identifiability and sensitivity. In some embodiments, the PDT for each field is assigned in consideration of the identifiability and sensitivity of underlying data. A Default DLP (Data Loss Prevention) Policy, Default Token Policy, supported Operations, and supported Validations of the data may be linked to the PDT. In some embodiments, the PDT is a coded value.

Identifiability refers to the ease with which an individual could be identified using data. In some embodiments there may be three or more values. Low represents data that cannot be easily identified. Some examples are Country, State and ZIP code. Moderate represents data that can be identified relatively easily when combined with other data but cannot uniquely identify the person, for example education information or employment information. High represents data that can uniquely identify the person, for example name, address, telephone number or email address.

Sensitivity refers to the level of damage that could be caused to the person the data belongs to if compromised. In some embodiments there may be three or more values. Low represents data that does not cause harm more significant than an inconvenience, such as changing a telephone number. Moderate represents data that could result in financial loss due to identity theft or denial of benefits, public humiliation, discrimination, and the potential for blackmail. High represents data that involves serious physical, social, or financial harm, resulting in potential loss of life, loss of livelihood or inappropriate physical detention.

Using the identifiability and sensitivity considerations, a default DLP policy may be assigned that defines how data may be stored. In some embodiments, there are four data storage techniques that may be used. Masking may be used to partially mask data without changing its format. This renders the data non-identifiable. For example, the email address johndoe@gmail.com becomes ****@gmail.com. Redacting may be used to completely obscure all the data. No part of the data is revealed. For example, the email address johndoe@gmail.com becomes REDACTED. Tokenization is a third option. Tokenization is a process of substituting sensitive data with a non-sensitive equivalent, referred to as a token, that has no extrinsic or exploitable meaning or value. The token is a reference (or an identifier) that maps back to the sensitive data and can be used instead of the actual sensitive data. In some embodiments, a random token or a format preserving token or both may be used to support different levels of privacy and use.

A random token is not derived from input data. It is stored in the secure data vault as a placeholder for the actual sensitive data. In some cases, it may be used as an index to the input data that is only accessible to those with sufficient privileges. A format-preserving token uses the same format as the original input data but does not include the information of the input data. For example, the clear-text data johndoe@gmail.com could be tokenized as bwe9f0n@h89f2.3b1. The token retains the same format as the original data but is unreadable.

Any secure data vault may be configured with a set of default privacy data types because the identifiability and sensitivity of user data, e.g., a telephone number or payment account number, is the same or similar regardless of the purpose or use of the secure data vault. Other types of data may require specific configurations to be used and there may be special considerations such as when the accessibility of particular data fields is very important. As the data is added to the secure data vault, validations may be used to limit the values entered for a privacy data type. In some embodiments some fields require that the data is expressed in a regularized way. With regular expressions, some privacy data types have a specific format or a specific allowed character set that must match with the input data. These constraints are validated using regular expression validation. For example, each SSN should be nine digits, which may be in a formatted or unformatted pattern. In some embodiments some fields require that the data is within a range. With bounded values some privacy data types should only be allowed to have values within a particular range or from a predefined set. A predefined set of values disallows invalid values for these privacy data types. For example, users should only select a country from a list of possible country values.

Figure 7:
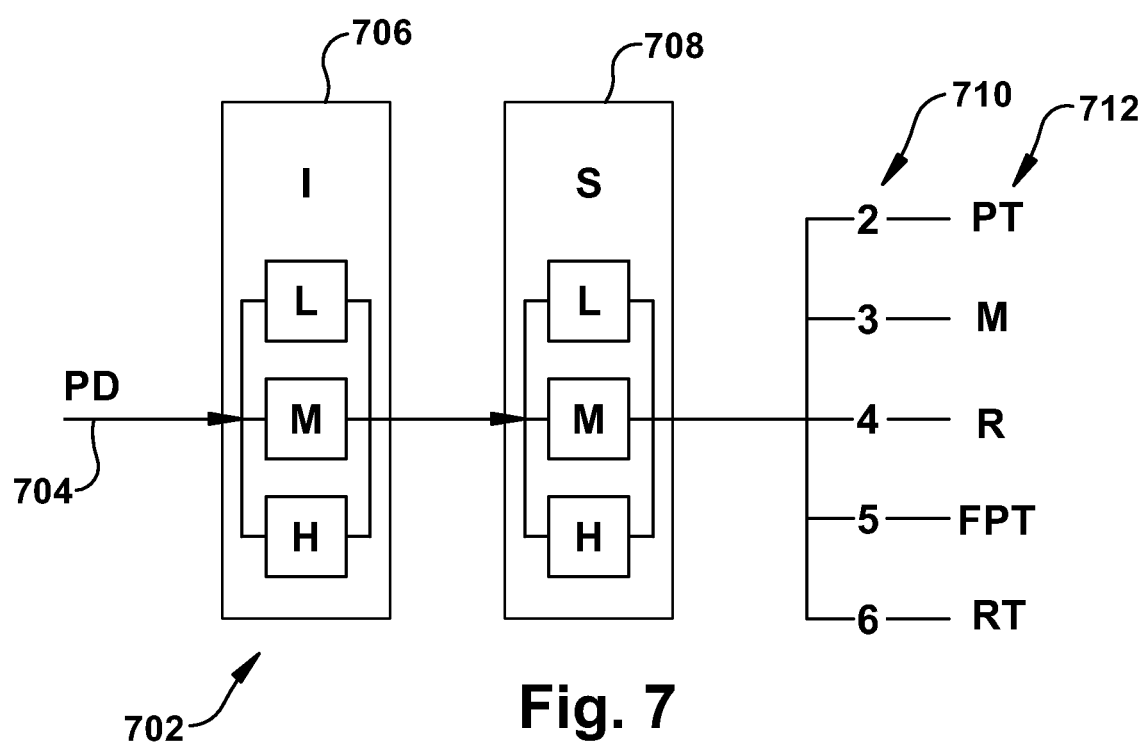
FIG. 7 is a decision tree diagram for selecting a DLP (Data Loss Prevention) policy

FIG. 7 is a decision tree diagram for selecting a DLP (Data Loss Prevention) policy based on the PDT (Privacy Data Type) for a particular element or field in a secure data vault. In the decision tree 702, a type of privacy data 704 is first subjected to an identifiability analysis 706. As a result, the type will be awarded a score of low, medium, or high. The type is then given a value of 1, 2, 3 accordingly. The type is then subjected to a sensitivity analysis 708 and awarded a score of low, medium, high which is then mapped to another value of 1, 2, or 3. In this simple example, the values are added and mapped to a final score 710 of possible values from 2 for low identifiability and low sensitivity to 6 for high identifiability and high sensitivity. There may be many other levels and different types of levels but three levels are used here for simplicity. Different functions other than addition may be used to combine the scores including weighting and scaling so that there are more than 6 possible results.

The final score 710 is then mapped to a DLP policy 712. In this example there are 5 possible scores from 2-6 and 5 possible DLP policies. The policies reflect how the data is stored and accessed in a portion of the secure data vault that is accessible to non-administrative roles. Different policies may be used in a different order and there may be more or fewer levels of data loss prevention. The DLP policy is a technique to prevent data from being captured by outsiders by limiting the nature of the data that can be accessed. In some embodiments, the original full core data is stored encrypted in a primary partition of the secure data vault and the same data is also stored with operation-specific encryption in a secondary partition of the secure data vault in accordance with the respective DLP policy. Any non-administrative access is only to the secondary partition through a role. The secondary partition prevents data from being transmitted or accessed in the clear. In the illustrated example, the lowest priority DLP policy is mapped to a plain text policy. The next priority DLP policy is mapped to a masking policy. The next priority is mapped to a redaction policy. The second highest priority DLP policy is mapped to a format preserving token policy and the highest priority DLP policy is mapped to a random token policy. The policies are provided as simplified examples to indicate how different policies may be selected based only on the PDT.

Data may also be stored in the secure data vault based on roles or operations or both. As mentioned above, each role has one or more policies attached to it. The policies allow access only to certain data and only to perform certain operations. One policy may allow for statistics to be performed using values for multiple customers in a particular field, such as an average balance of all customers. Another policy may only allow for a confirmation regarding a particular customer using the same field, such as that a customer has a balance of at least e.g. $1,000. Many policies may restrict all access to particular fields. For the administrator roles, there may be operations to read, write, and edit the data in plain text. For other roles involved in the regular workflow, operations may be significantly limited.

In some embodiments, there are three categories of operations: Exact Match; Aggregation; and Order. There may be more or fewer operation categories to support different uses of the data stored in the secure data vault. Exact match operations attempt to match the query to a value in the data exactly. An exact match operation can retrieve a record for a specific user with a particular email address, SSN, or another identifier. Aggregation operations attempt to aggregate values and produce a SUM, AVERAGE, MAXIMUM, or other statistical operation within a given query. Order operations attempt to produce range operations such as GREATER THAN or LESS THAN. An All Ops status may be added to a PDT to allow all the operations. In some embodiments, the data may be stored three different ways to support the All Ops status.

By limiting operations to those operations that are needed, the related data may be encrypted in a way that supports the needed operations on fully encrypted data. This ability preserves the security and privacy of the data while making it actionable. The privacy data type may be used together with the data type and the kind of data to determine the operations that can be performed. As an example, aggregation and order operations are not likely needed for a telephone number. Exact match operations are not likely needed for numerical scores or account balances.

Polymorphic encryption as described herein provides for a single record to be encrypted and stored in different ways to enable different operations. Consider an organization which performs financial transactions, such as banking or investing. A customer service role may require an ability to confirm the last 4 digits of the SSN to verify a customer. An investigation role may require that the entire SSN be matched with a particular account number. A tax reporting role may require that the entire SSN be included in reports to tax agencies. The SSN has high identifiability and high sensitivity. Each role requires a different level of access to the SSN. Instead of providing a single stored copy of the SSN accessible to each role, the SSN may be stored in three different instances in three different ways, one for each role. More instances with different encryption schemes may be added as more roles are added. This allows each role to perform its necessary operation quickly without decrypting the SSN.

The customer service role only requires an exact match operation on a portion of the SSN. The SSN may be stored masked or partially redacted in an encrypted form that only supports a match function. As an example, a hash function may be used. Each SSN is written into the secure data store by first masking or redacting the first 5 digits, hashing the remaining 4 digits, and then storing the result. As mentioned above, the result will be connected to an index so that the hashed 4 digits are associated with the appropriate customer. A person in customer service receives the customer's name and the actual last 4 digits from the customer, enters the digits into a form, sends the form, and then receives a result of there being a match or not. In the background, the user interface or API, hashes the last 4 digits and then compares the hashed value to that of all customers with the same or a similar name in the secure data store. The user interface or API may even provide a list of names that match the hashed value.

To perform the exact match operation in this way, the value in the secure data vault is never decrypted. In addition, the actual last 4 digits are never sent through the communications interface from the customer representative to the secure data vault. The actual last 4 digits can be hashed before they are sent. This allows quick access to the result with very low risk to the customer. The investigation role may operate similar to the customer service role except that the entire SSN is used and not just the last 4 digits. The tax reporting role may operate using a token. A unique token may be associated with the customer, such as a random token. Only when the report is generated is the actual SSN required and the person generating the report does not require it. Note that for the SSN, there is no need for aggregation and order operations.

Figure 8:
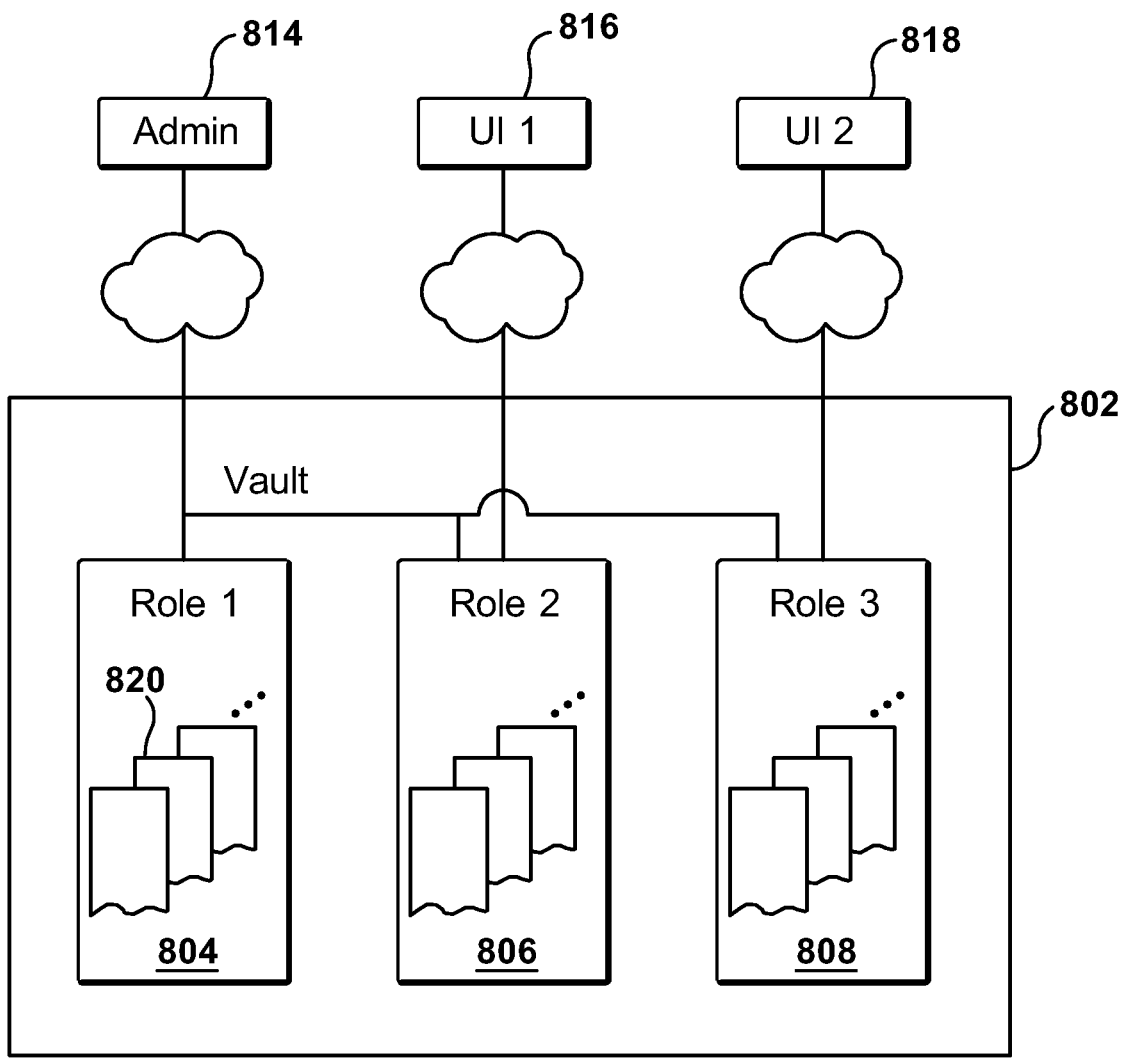
FIG. 8 is a diagram of a secure data vault configured with different partitions to support different roles according to embodiments of the invention.

FIG. 8 is a diagram of an example secure data vault that is configured with different partitions to support different roles. The vault 802 contains a primary data partition 804, a secondary data partition 806 and a ternary data partition 806. There may be more or fewer data partitions to suit different implementations. The primary data partition includes tables 820 for storing the data in the relational database format described above. While three tables are shown, there may be more or fewer. Other data schemas and database formats may be used instead. In this example, an administrator 814, such as a vault editor or vault owner in a first role has access to all three partitions to add, remove, and edit entries. The administrator 814 is connected to the vault through a cloud connection in this example. The vault 802 may be local on an intranet, remote through a cloud connection as shown or hosted by a third party and accessible through a local area network or wide area network. The governance level, described above may be provided at the local admin or with the vault. Depending on the configuration, there may be roles that are allowed access to the data for a particular purpose. As an example, an API may be allowed access to a full telephone number in order to operate a telephone dialing application.

A second data partition 806 may be configured to support a user interface 816 attached to a second role. The second data partition 806 may be configured to contain only the data that is required for the second role and only encrypted in a format suitable for use by the second role. A third data partition 808 is configured to support a second user interface 818 attached to a third role. There may be many more roles and corresponding data partitions. In addition, a user interface may be attached to more than one role.

In some embodiments, the full scope of the secure data is stored in the primary partition 804 or a different partition in an encrypted form, such that the primary data partition includes all of the tables 820 for storing the data in the relational database format described above. The primary partition may be used by administrators as a source to encrypt and store data into the secondary, ternary, and additional data partitions to support any desired operation field combinations. As a result, the secondary and additional data partitions 806, 808 may contain much less data than the primary data partition 804.

In another embodiment, there is no single partition that contains all of the desired information. An administrator may have a GUI that presents as if the information is all stored in one location as shown, for example in FIGS. 5 and 6, but that information may not exist in the illustrated format. Instead, the data shown to the administrator may be an aggregation of multiple values stored in different locations. As an example, a telephone number may be stored in one location as only the country code, in another location as only the area code, and in a third location as only the local code, each encrypted in a different format. This makes it very difficult for an attacker to obtain the complete telephone number. For the appropriate administrator, the system may access all three locations, decrypt all three values, and present them as a single field in order to present the telephone number in the persons 502 or consumers 602 tables of an administrator GUI.

Figure 9:
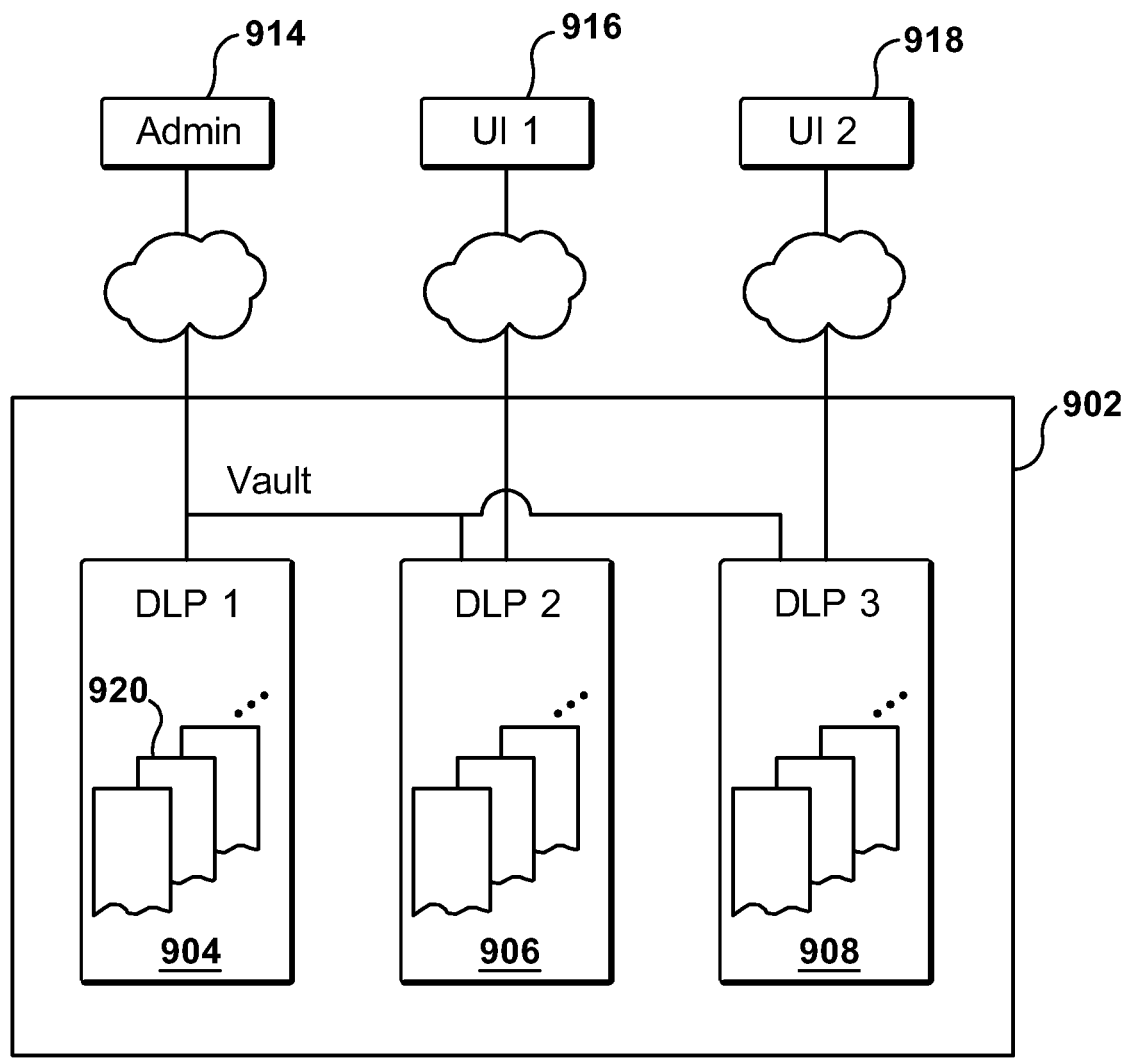
FIG. 9 is a diagram of a secure data vault configured in different partitions to support different DLP policies according to embodiments of the invention.

FIG. 9 is a diagram of an example secure data vault that is configured in different partitions to support different DLP policies. The vault 902 contains a primary data partition 904. The primary data partition may use tables 920, as shown, for storing the data or any other suitable data format and schema. The tables 920 in the primary data partition 904 include fields of records to which a first DLP policy applies. In this example, all of the data for which the first DLP policy applied is stored in the primary data partition. The values may be stored differently for different fields and there may be more than one copy of values for the same field. Each copy may be stored to support a different operation but with the same DLP policy.

A secondary data partition 906 may be configured to support a user interface 916 attached to a second role. The secondary data partition 906 may be configured to contain data that is encrypted using a second DLP policy. This data may be masked and hashed or encrypted in any other suitable way. A ternary data partition 908 is configured to contain data that is encrypted using a third DLP policy. This data may be tokenized or encrypted in any other suitable way. There may be more partitions to support more DLP policies as may be desired for the particular use of the secure data vault 902. Alternatively, instead of DLP policies, each data partition may be configured to support a particular operation.

As shown, a user interface 914, 916, 918 may be provided access to one or all of the data partitions 904, 906, 908 depending on the roles for that user interface and the operations that are allowed by those roles. Three interfaces are shown to represent a variety of different interfaces and roles corresponding to different users and applications that may access the secure data vault. An administrator 914 has access to all three data partitions 904, 906, 908 as is appropriate for an administrative role to add, remove, and edit entries. A first user interface 916 has specific operations that it may perform based on policies attached to a second role. The first user interface has access to some or all of the data partitions to perform the allowed operations of the attached role. A third user interface 918 has specific operations that it may perform based on policies attached to a third role. The third user interface also has access to some or all of the data partitions to perform the allowed operations. There may be many more roles and corresponding data partitions. In addition, a user interface may be attached to more than one role.

In some embodiments, there may be a partition with the full scope of the secure data in encrypted form. The other data partitions may contain much less data than the full data partition because there may be some data that is not suitable for encryption using another one of the DLP policies. The examples of FIGS. 8 and 9 present two alternative schemas to organize the data stored in the secure data vault. A variety of other schemas may alternatively or additionally be used. As another example, the schema may be like that of FIGS. 5 and 6 except that additional rows are added for each copy of a value. Instead of one row or field for telephone number, the same table may contain a row for the area code encrypted to enable an aggregation operation, a row for the local code encrypted to allow a match operation, and a row for the complete telephone number encrypted to allow an autodial operation. Still more rows may be added with different encryption schemes to suit more uses or operations. In the example of FIG. 8, these three rows would be stored in different data partitions because each row corresponds to different operations and roles. In the example of FIG. 9, theses three rows may be stored in two data partitions because the DLP policy for an area code is different from the DLP policy for a complete telephone number.

As described above, in some embodiments the data vault includes at least a primary partition having a first subset of a plurality of records, each record of the first subset having a plurality of fields and an encrypted value for each of at least a portion of the fields encrypted according to a first encryption scheme, each record corresponding to a different index number and a secondary partition having a second subset of the plurality of records, each record of the second subset having the values for at least a portion of the fields, wherein the values of the second subset are encrypted according to a second encryption scheme that is different from the first encryption scheme wherein the first encryption scheme is configured to permit a first set of operations on the values when the values are encrypted and the second encryption scheme is configured to permit a second set of operations on the values when the values are encrypted.

The first and the second encryption schemes may include at least one of masking, redacting, and tokenizing. The first and the second encryption schemes may correspond to different data loss prevention policies. The first set and the second set of operations may include at least one of match operations, aggregation operations, and order operations. The match operation may be attached to a policy to access records in the secondary partition using the match operation and wherein the match operation is accessible to a user through an interface. The policy may be attached to a role and the user has credentials to access the role.

The data vault may include a governance layer for access control to the secondary partition from the policy. The governance layer may control access to encrypted values and operations using the policy. A first value may be encrypted in the first encryption scheme in the first partition and the first value may also be encrypted in the second encryption scheme in the second partition.

An encryption type field may be associated with each field of the primary partition, wherein the encryption type field identifies the first encryption scheme. The data vault may also include a ternary partition having the plurality of records, wherein the values of the plurality of records are encrypted according to a third encryption scheme that is different from the first and the second encryption scheme, wherein the third encryption scheme is configured to permit the values of the records to be accessed.

As described above, in some embodiments a secure data access system includes a data vault having a plurality of copies of a value, a first copy being configured to enable a first operation and a second copy being configured to enable a second operation, a governance layer having a plurality of policies, at least a first policy configured to enable the first operation, the governance layer configured to permit the first operation for an authenticated user, and an interface layer having a plurality of roles, each role supporting a selected policy, the interface layer further comprising a user interface to receive user credentials, to link the credentials to a role and to send an authentication of the user and the role to the governance layer.

The first copy may be configured to enable the first operation by being encrypted using an encryption scheme that allows the first operation to be performed without decrypting the first value. The second copy may be encrypted and partially redacted as an example.

Figure 10:
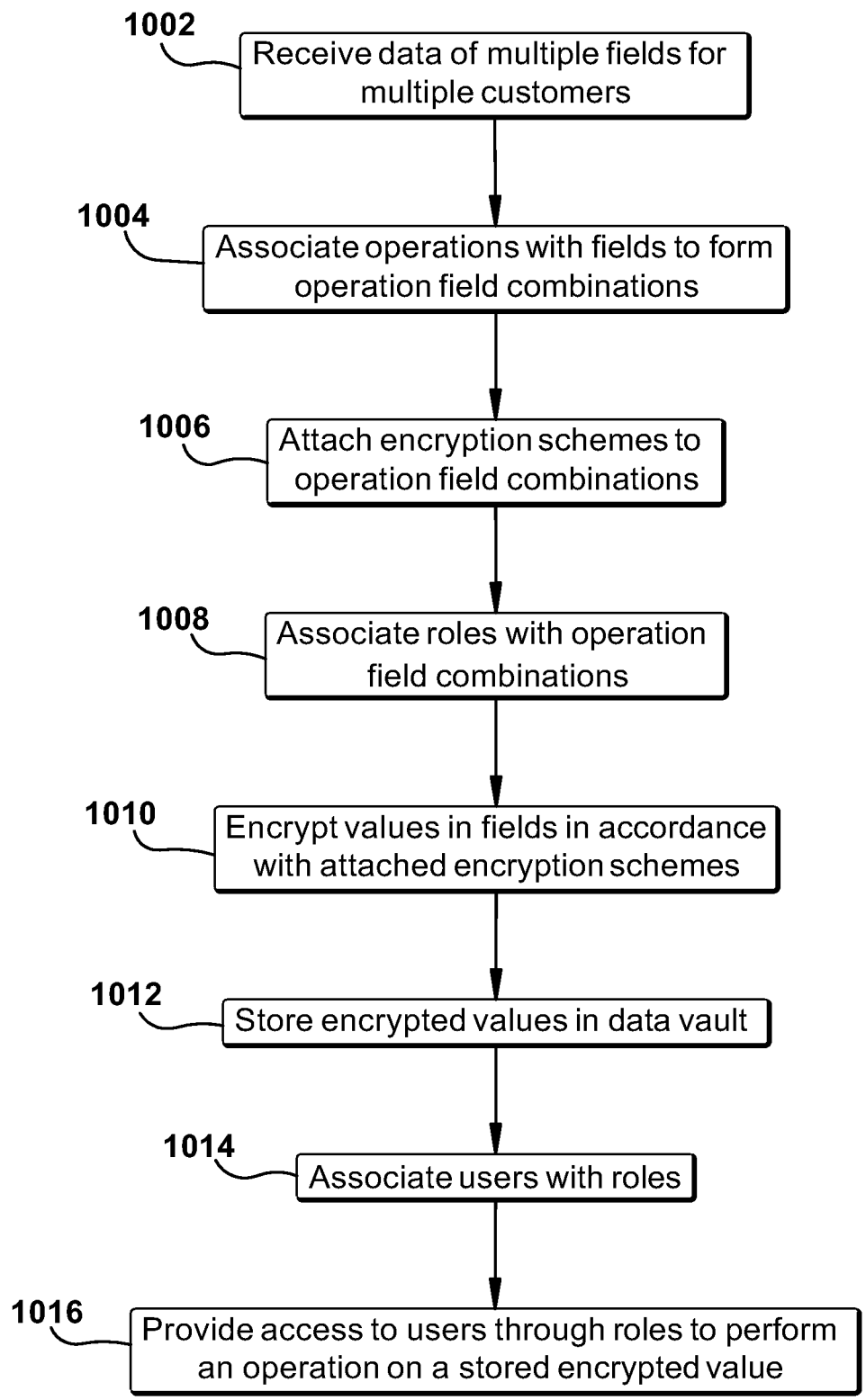
FIG. 10 is a process flow diagram of configuring a secure data vault according to embodiments of the invention.

FIG. 10 is a process flow diagram of configuring a secure data vault in accordance with embodiments as described herein. At 1002 a data set is received for storage and configuration within a secure data vault. The data set has values in multiple different fields for multiple different customers. The data set may have any of a variety of different structures and schema. In some cases, the data is first parsed to pull out the data that is to be secured and to organize the data in a suitable way. The data may also be analyzed to determine a suitable DLP policy for each field in the data. In addition, operations are determined for the use of the data. The operations reflect how the data is to be used so that the data can be stored in a manner that enables the operations that are to be performed on the data values. There may be one operation for a data field or there may be multiple operations for one data field. It there are multiple operations then a copy may be stored for each operation. There is no particular limit to the number of operations that may be supported.

At 1004, the operations are associated with at least a portion of the different fields of the data set to form a plurality of operation field combinations. As mentioned above, an operation may be exact match for a social security number field or aggregation for a telephone number field. At 1006 an encryption scheme is attached to each operation field combination. The encryption scheme will be based on the operation and may also be based on the data type and the DLP policy for the data field. The attached encryption scheme is selected to enable the operation of the operation field combination to be performed without decrypting the encrypted respective value. Some example of such operation and encryption scheme combinations are described above.

At 1008, roles are associated with operation field combinations. Each role will have at least one operation field combination and an operation field combination may be associated with more than one role. As mentioned only some operations may be used with a particular field. For example, sums, inequalities, averages, and similar mathematical operations may not be useful with telephone numbers, but other operations may be very useful. The roles help to determine which users have access to perform particular operations on a particular field of the data set.

At 1010 the values in at least a portion of the plurality of different fields are encrypted in accordance with the attached encryption scheme and at 1012, these encrypted values are stored a data vault. At least some of the values are encrypted in accordance with more than one encryption scheme and stored as separate values for the same or a different field.

At 1014, a user is associated with at least one role. This role allows the user to perform the associated operation on a particular field of the data set. The permission comes after authenticating the user so that providing access to the operations of a particular role comes after authenticating the user. The user may have access to more than one role and there may be additional permissions that affect which records any particular user or role may be able to access.

At 1016, access is provided to the user through a role to perform an operation that is associated with the role on the stored encrypted value in the field that is associated with the operation field combination that is associated with the role.

In some embodiments each field or a group of fields or a table may use encryption type fields to store a parameter to identify the encryption scheme that has been applied to values in a particular field. In such as case an encryption type parameter is associated with an encryption scheme that has been attached to an operation field combination. The encryption type parameter is then stored in association with the values that are encrypted in accordance with the respective encryption scheme.

Figure 11:
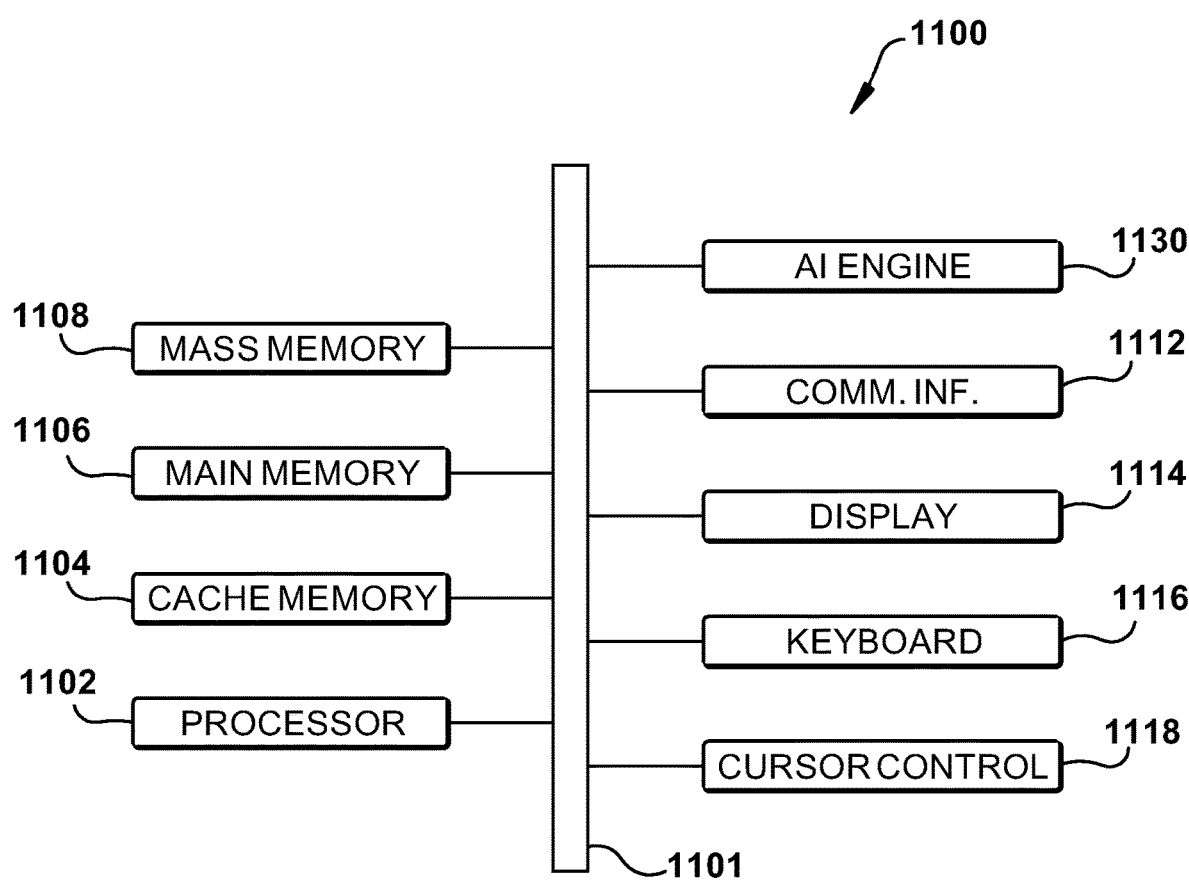
FIG. 11 is a block diagram of a computer system according to embodiments of the invention.

FIG. 11 is a block diagram of a computer system 1100 representing an example of a system upon which features of the described embodiments may be implemented, such as the user devices, interfaces, governance, workspace, and data vaults. In the case of cloud services, one or more of the components may be virtualized. The computer system includes a bus or other communication means 1101 for communicating information, and a processing means such as one or more microprocessors 1102 coupled with the bus for processing information. The computer system further includes a cache memory 1104, such as a random access memory (RAM) or other dynamic data storage device, coupled to the bus for storing information and instructions to be executed by the processor. The main memory also may be used for storing temporary variables or other intermediate information during execution of instructions by the processor. The computer system may also include a main nonvolatile memory 1106, such as a read only memory (ROM) or other static data storage device coupled to the bus for storing static information and instructions for the processor.

A mass memory 1108 such as a solid-state disk, magnetic disk, disk array, or optical disc and its corresponding drive may also be coupled to the bus of the computer system for storing information and instructions. The computer system can also be coupled via the bus to a display device or monitor 1114 for displaying information to a user. For example, graphical and textual indications of installation status, operations status, schema configurations, and other information may be presented to the user on the display device. Typically, an alphanumeric input device 1116, such as a keyboard with alphanumeric, function and other keys, may be coupled to the bus for communicating information and command selections to the processor. A cursor control input device 1118, such as a mouse, a trackball, trackpad, or cursor direction keys can be coupled to the bus for communicating direction information and command selections to the processor and to control cursor movement on the display.

A communication device 1112 is also coupled to the bus. The communication device may include a wired or wireless modem, a network interface card, or other well-known interface devices, such as those used for coupling to Ethernet, token ring, cellular telephony, Wi-Fi, or other types of physical attachment for purposes of providing a communication link to support a local or wide area network (LAN or WAN), for example. In this manner, the computer system may also be coupled to a number of clients or servers via one or more conventional network infrastructures, including an Intranet or the Internet, for example.

The system of FIG. 11 further includes an AI (Artificial Intelligence) engine. This may be implemented in dedicated hardware using parallel processing or in the processor 1102 or using some combination of resources. The AI engine may also be external to the computer system 1100 and connected through a network node or some other means. The AI engine may be configured to use historical data accumulated by the computer system or another system to build a model that includes weights and criteria to apply to the selection processes, operations, and encryption among others. The model may be repeatedly rebuilt using the accumulated data to refine and increase accuracy.

A lesser or more equipped computer system than the example described above may be preferred for certain implementations. Therefore, the configuration of the exemplary computer system will vary from implementation to implementation depending upon numerous factors, such as price constraints, performance requirements, technological improvements, or other circumstances. The computer system may be duplicated in different locations for distributed computing. As an example, the system may use a simple pre-programmed deterministic selection model instead of an AI model and the AI engine.

While the steps described herein may be performed under the control of a programmed processor, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the methods described herein may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present description includes various steps, which may be performed by hardware components or may be embodied in machine-readable instructions, such as software or firmware instructions. The machine-readable instructions may be used to cause a general-purpose or special-purpose processor programmed with the instructions to perform the steps. Alternatively, the steps may be performed by a combination of hardware and software.

The described operations may be provided as a computer program product that may include a machine-readable medium having stored instructions thereon, which may be used to program a computer (or other machine) to perform a process according to the present invention. The machine-readable medium may include, but is not limited to optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

Some embodiments described herein pertain to a non-transitory machine-readable medium comprising a plurality of instructions, executed on a computing device, to facilitate the computing device to perform one or more of any of the operations described in the various embodiments herein.

Although this disclosure describes some embodiments in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A data vault comprising:
   a primary partition to support a first operation, the primary partition having a plurality of records, each record having a plurality of fields, each field having a value, wherein the values for at least a portion of the fields are encrypted according to a first encryption scheme; and
   a secondary partition to support a second operation, the secondary partition having the plurality of records, each record of the second plurality of records having the values for the at least a portion of the fields, wherein the values for the at least a portion of the fields are encrypted according to a second encryption scheme that is different from the first encryption scheme,
   wherein the first encryption scheme is selected to enable the first operation on the values when the values are encrypted without decrypting the values and the second encryption scheme is selected to enable the second operation on the values when the values are encrypted without decrypting the values.

2. The data vault of claim 1, wherein the first encryption scheme includes at least one of masking, redacting, and tokenizing.

3. The data vault of claim 1, wherein the first encryption scheme and the second encryption scheme correspond to different data loss prevention policies.

4. The data vault of claim 1, wherein the second operation includes at least one of match operations, aggregation operations, and order operations.

5. The data vault of claim 4, wherein the match operation is attached to a policy to access records in the secondary partition using the match operation and wherein the match operation is accessible to a user through an interface.

6. The data vault of claim 5, wherein the policy is attached to a role and the user has credentials to access the role.

7. The data vault of claim 5, further comprising a governance layer for access control to the secondary partition from the policy.

8. The data vault of claim 7, wherein the governance layer controls access to encrypted values and operations using the policy.

9. The data vault of claim 1 wherein a first value is encrypted in the first encryption scheme in a first field of the primary partition and the first value is encrypted in the second encryption scheme in a second field of the secondary partition.

10. The data vault of claim 1, further comprising an encryption type field associated with each field of the primary partition, wherein the encryption type field identifies the first encryption scheme.

11. The data vault of claim 1, further comprising a ternary partition having the plurality of records, wherein the values of the plurality of records are encrypted according to a third encryption scheme that is different from the first and the second encryption scheme, wherein the third encryption scheme is configured to permit the values of the records to be accessed.

12. The data vault of claim 1, further comprising a secure data access system having:
a governance layer having a plurality of policies, at least a first policy configured to enable the first operation, the governance layer configured to permit the first operation for an authenticated user; and
an interface layer having a plurality of roles, each role supporting a selected policy, the interface layer further comprising a user interface to receive user credentials, to link the credentials to a role and to send an authentication of the user and the role to the governance layer.

13. The data vault of claim 1, further comprising an association of the first operation with at least a portion of the fields of the primary partition.

14. The data vault of claim 1, further comprising a role to perform the operation associated with the at least a portion of the fields of the primary partition.

15. A method comprising:
encrypting values of at least a portion of a plurality of fields of a plurality of records in a primary partition of a data vault to support a first set of operations according to a first encryption scheme;
encrypting the values of the at least a portion of a plurality of fields of a plurality of records in a secondary partition of the data vault to support a second set of operations according to a second encryption scheme;
performing the first set of operations on the values in the primary partition when the values are encrypted without decrypting the values wherein the first encryption scheme is selected to enable the first set of operations on the values; and
performing the second set of operations on the values in the secondary partition when the values are encrypted wherein the second encryption scheme is selected to enable the second set of operations on the values without decrypting the values.

16. The method of claim 15, wherein encrypting the values comprises encrypting at least a subset of values in accordance with more than one encryption scheme and storing each encrypted value having a different encryption scheme in a different field of the plurality of records.

17. The method of claim 15, further comprising;
associating a first encryption type with the first encryption scheme; and
storing the first encryption type in association with values that are encrypted in accordance with the first encryption scheme.

18. The method of claim 15, further comprising selecting the first encryption scheme based on the first set of operations and a data loss prevention policy for the respective field.

19. The method of claim 15, wherein performing the first set of operations comprises authenticating a user to a role that is associated with the first set of operations and enabling at least one of the operations of the first set of operations for the authenticated user.

20. The method of claim 15, wherein the first and the second encryption schemes include at least one of masking, redacting, and tokenizing.

* * * * *